(12) United States Patent
Vercruysse (10) Patent No.: US 11,119,029 B2
(45) Date of Patent: Sep. 14, 2021

(54) PARTICLE DETECTION USING THIN LENSES

(71) Applicant: IMEC VZW, Leuven (BE)

(72) Inventor: Dries Vercruysse, Sint-Andries (BE)

(73) Assignee: IMEC VZW, Leuven (BE)

(*) Notice: Subject to any disclaimer, the term of this patent is extended or adjusted under 35 U.S.C. 154(b) by 215 days.

(21) Appl. No.: 16/335,578

(22) PCT Filed: Sep. 18, 2017

(86) PCT No.: PCT/EP2017/073526
§ 371 (c)(1),
(2) Date: Mar. 21, 2019

(87) PCT Pub. No.: WO2018/054852
PCT Pub. Date: Mar. 29, 2018

(65) Prior Publication Data
US 2020/0018684 A1 Jan. 16, 2020

(30) Foreign Application Priority Data
Sep. 22, 2016 (EP) .................................... 16190231

(51) Int. Cl.
*G01N 15/00* (2006.01)
*G01N 15/14* (2006.01)
(Continued)

(52) U.S. Cl.
CPC ......... *G01N 15/1434* (2013.01); *G01N 21/47* (2013.01); *G01N 2015/1006* (2013.01)

(58) Field of Classification Search
CPC ............... G01N 15/1434; G01N 21/47; G01N 2015/1006
See application file for complete search history.

(56) References Cited

U.S. PATENT DOCUMENTS

| 6,760,107 B1 | 7/2004 | Drake | |
| 7,671,987 B2 * | 3/2010 | Padmanabhan | G01B 11/272 356/338 |
| 2018/0045562 A1 * | 2/2018 | Santori | G02B 6/12007 |

FOREIGN PATENT DOCUMENTS

EP 2 796 854 10/2014

OTHER PUBLICATIONS

Kerman et al., "On-chip fluorescence excitation and collection by focusing grating couplers", Procee3dings Optical Diagnostics of Living Cells II, vol. 9891, May 13, 2016, p. 98911L.
(Continued)

*Primary Examiner* — Rebecca C Bryant
(74) *Attorney, Agent, or Firm* — McDonnell Boehnen Hulbert & Berghoff LLP (57) ABSTRACT

An optical excitation system comprises a substrate (105) comprising at least one delivery means (104), for delivering analytes (109) into at least one region of interest (103), at least one radiation carrier (101) for directing at least one radiation beam from the at least one radiation carrier (101) into the at least one region of interest (103). The substrate (105) includes a thin lens system (120) comprising at least a first thin lens (121), for collimating radiation from the at least one region of interest (103) to a remote detection system (130). A particle sensor and sensing system comprising the excitation system are also provided, for example a modular particle sensor and modular sensing system, wherein the optical excitation system may be single use and disposable.

19 Claims, 5 Drawing Sheets

(51) Int. Cl.
 *G01N 21/47* (2006.01)
 *G01N 15/10* (2006.01)

(56) References Cited

OTHER PUBLICATIONS

International Search Report and Written Opinion dated Dec. 22, 2017 for International Application No. PCT/EP2017/073526 filed Sep. 18, 2017, 12 pages.

\* cited by examiner

PARTICLE DETECTION USING THIN LENSES

CROSS-REFERENCE

This application is a section 371 of International application no. PCT/EP2017/073526, filed Sep. 18, 2017, which claims priority from EP Patent application no. 16190231.7, filed Sep. 22, 2016, both of which are incorporated by reference in their entirety.

FIELD OF THE INVENTION

The present invention relates to the field of particle detection and analysis. More specifically it relates to devices for particle detection and analysis via optical means, and to manufacturing methods thereof. In particular embodiments, it relates to luminescence (e.g. fluorescence)-based detection, Raman scattering-based detection, suitable for flow analysis. Other detection principles which may be used in the present invention may for instance be absorption or light scattering.

BACKGROUND OF THE INVENTION

Cytometry comprises the analysis and sorting of single analytes in a flow, typically a continuous flow, of particles. The analytes may include a variety of types, typically cells, but also it can be extended to other particles such as viruses, antibodies, etc. A cytometer typically comprises means of delivering analytes to a detection region, or region of interest (ROI), for example in a flowing stream (e.g. in a fluid, etc.). It also comprises excitation means for irradiation of the detection region, for example using laser, LEDs, or other means of illumination.

In a cytometer, detectors can receive and measure the light absorption or scattering properties of the analytes. In case of fluorescence cytometry, fluorescence either from the analytes themselves or from fluorescent compounds attached to the analytes may be detected. In the latter case, the analysis and optionally the sorting technique applied are based on labelling analytes with e.g. fluorophores and on detecting the labelled particles by irradiating them with an excitation source and detecting the fluorescent emission. In molecular diagnostics, fluorescence is often used to determine the concentration of an analyte. These signals are typically weak and outshined by forward scattering and by the excitation signal itself, thus they are normally detected as radiation emitted from the ROI at angles away from the forward-scattering. This requires expensive and bulky free-space optics. Additionally, radiation collectors and/or detectors should be wide-angled.

This is not compatible with the requirement for compact devices, which are desirable for point-of-care testing and analysis, portability, etc. Normally, such desirable cytometers should be integrated on chip and/or should be comprising microfluidic channels; thus light is manipulated via small coupling gratings. Collecting incoherent light of a relatively large object in a very narrow waveguide system is highly inefficient.

SUMMARY OF THE INVENTION

It is an object of embodiments of the present invention to provide a fast, reliable and compact optical detector suitable for effective analysis and cytometry in an integrated circuit, e.g. a photonics circuit.

It is an advantage of embodiments of the present invention that a modular, compact, disposable collimation system is obtained in combination with an analyte delivery system. The fact that the optical excitation system is disposable makes it extremely useful for point-of-care and medical devices, for which, due to the nature of the analysis, medical regulations, etc. disposable devices are required. For such disposable devices, production costs should be under control and optimized. The optical system can be readily aligned with the ROI. It is an additional advantage that it can be used in combination with a detection system for a particle sensor, and is readily alignable with the detection system In a first aspect, the present invention provides an optical excitation system for a particle sensor, the system comprising a substrate comprising at least one delivery means for delivering analytes into at least one region of interest, at least one radiation carrier for carrying radiation and directing at least one radiation beam from the at least one radiation carrier into the at least one region of interest, a thin lens system comprising at least a first thin lens, for example integrated in or on the substrate, for collimating radiation from the at least one region of interest to a remote detection system.

The substrate may be, but does not have to be, a transparent substrate. Alternatively, the substrate may be a semiconductor substrate like a Si substrate; and may comprise a cover glass covering at least part of the delivery means. In this later case, the radiation carrier may be waveguide photonics on the semiconductor, and the thin lens system may be provided on the cover glass.

Detection principles which may be used in the context of the present invention may for instance be luminescence detection such as fluorescence detection, absorption, light scattering, Raman scattering.

In some embodiments of the present invention, an excitation grating may be provided for directing at least one radiation beam from the at least one radiation carrier into the at least one region of interest.

In some embodiments of the optical excitation system according to the present invention, the thin lens system comprises at least one thin film lens. It is an advantage of embodiments of the present invention that a lens system can be obtained via lithographic means, using highly optimized and accurate techniques and combinations thereof.

In some embodiments of the optical excitation system, the at least one delivery means comprises at least one microfluidic channel. The present invention advantageously provides compact integration in a microfluidics device, for example for flow cytometry.

In a second aspect, the present invention provides a particle sensor comprising:

an optical excitation system according to embodiments of the first aspect of the present invention, a detection system comprising at least a first detector for detecting radiation within a predetermined range of wavelengths.

In some embodiments of particle sensor, the thin lens system of the optical excitation system is adapted to allow transmission and direction of radiation within a predetermined range of wavelengths from the region of interest into the detection system.

It is an advantage of embodiments of the second aspect of the present invention that a high amount of scattered incoherent light can be collected in a compact sensor. It is a further advantage that a modular particle sensor can be obtained, for example a disposable sensor in which only the module in contact with the analyte may be disposed, while the module comprising the detection system may be kept, hence reducing manufacturing costs. It is a further advantage that the optical system of the particle sensor may be readily in focus with the ROI, and it may be easily alignable with the detection system, for example via fixing means such as screws, bolts, sliding guides, rails, clips, magnetic locks, etc.

In some embodiments of the particle sensor of the present invention, the thin lens system of the optical excitation system comprises at least a second thin lens for detecting radiation within a further range of wavelengths, and the particle sensor comprises at least a second detector part of the detection system, for detecting radiation within the further range of wavelengths, and the thin lens system is adapted to direct radiation within a first range of wavelengths towards the first detector, and radiation within a further range of wavelengths to the second detector. It is an advantage of embodiments of the present invention that different number and type of analytes can be analyzed in the same flow using a single detection system with a compact, integrated or modular sensor. The signal emitted by a particle in the ROI may be classified even before it reaches the detector system in embodiments of a sensor of the present invention. In some embodiments adapted for fluorescence analysis of analytes attached to fluorescence biomarkers, different biomarkers and combinations thereof may be separately detected by each detector of the system, reducing strain in the sensing system, by separating the wavelength contributions of the emitted signal and separately analyzing each range of wavelength in a separate detector of the detection system.

Further, some embodiments may provide that each of the thin lenses of the thin lens system can be adapted to collimate radiation of different ranges of wavelengths from the region of interest a different detector of the detection system, advantageously obtaining a sensor resilient to variations in alignment in the direction between the detection system and the ROI, for example small deviations in the coupling of a modular sensor have no influence in the image quality and analysis.

In some embodiments of the particle sensor according to the second aspect of the present invention, the thin lenses of the thin lens system are positioned on a surface of the substrate between the delivery means and the detection system. It is an advantage of embodiments of the present invention that a luminescence and/or back-scatter, e.g. for fluorescence cytometry, can be obtained.

In some embodiments of the particle sensor according to the present invention, at least a further thin lens and a further detector are comprised, the thin lens adapted for directing side-scattered and/or forward-scattered radiation into at the further detector, advantageously improving particle detection. Further, information regarding morphology, size, roughness and internal complexity of an analyte may be retrieved.

For example, the particle sensor may comprise four thin lenses in a 2×2 matrix configuration, between the region of interest and four detectors, the detectors also arranged in a 2×2 matrix configuration. This is a compact, simple and reliable design. Up to 4 ranges of wavelength, e.g. 4 colors of radiation emitted by the ROI, can be independently analyzed, enabling a great flexibility in biomarker utilization.

In some embodiments of the particle sensor according to the present invention, a radiation source for sending, into the radiation carrier, radiation within the range of wavelength of visible light is included, wherein the substrate comprises a glass layer. It is an advantage of embodiments of the present invention that optical analysis (luminescence analysis, Raman, fluorescence cytometry, etc.) may be provided.

In some embodiments of the particle sensor according to the present invention, at least one thin lens comprises a Fresnel lens, for example a thin film Fresnel-type lens, for example comprising ridges with a thickness of the wavelength to be collimated towards a predetermined direction, which can be obtained by lithographic methods.

In a third aspect, the present invention provides a sensing system comprising a plurality of particle sensors according to embodiments of the second aspect, a plurality of radiation carriers being provided along the at least one delivery means, wherein the delivery means is at least one microfluidic channel for providing particles to a plurality of regions of interest.

It is an advantage of embodiments of the present invention that a plurality of measurements for different wavelengths and markers can be obtained in a single particle flow.

In some embodiments of the sensing system of the present invention, the at least one delivery means comprises a plurality of channels, advantageously providing parallel sensing.

Further embodiments of the sensing system of the present invention include an excitation grating for directing the at least an excitation radiation beam from the at least one radiation carrier into a region of interest comprising the whole width of the channel. For example, light sheets may advantageously be provided, e.g. with a simple laser grating. This facilitates for example fluorescence imaging.

In some embodiments of the present sensing system, the plurality of detectors are integrated in a single unit, advantageously allowing obtaining a modular, compact, disposable collimation system which can be used in a detection system for particle analysis.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Any reference signs in the claims shall not be construed as limiting the scope.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention. In the different drawings, the same reference signs refer to the same or analogous elements.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is to be understood that embodiments of the invention may be practiced without these specific details. In other instances, well-known methods, structures and techniques have not been shown in detail in order not to obscure an understanding of this description.

Where in embodiments of the present invention reference is made to "radiation", reference is made to mainly photonic radiation, such as visible light, but also including infrared and ultraviolet light. Accordingly, when in embodiments of the present invention reference is made to a material being "transparent" to the used radiation, reference is made to a property of materials in which radiation impinging onto that material (e.g. IR, visible and/or UV radiation) is transmitted through the material. In some embodiments, the substrate may not be completely transparent to the used radiation, but may be provided, at some locations, with a cover glass which is transparent to the used radiation.

Where in embodiments of the present invention reference is made to a "region of interest", or simply "ROI", reference is made to a zone through which a particle of interest, e.g. an analyte (such as a cell, particle, stained cell, circulating tumor cell, protein, etc.) may cross. Typically, the ROI is the region illuminated by a probe beam (or excitation beam), for instance emanating from an excitation grating. The ROI may have a volume comparable to or smaller than the analyte. In this case, the system is said to provide point information and the probe beam focuses to said point. The ROI may be a planar zone, such a (virtual) wall through which analytes cross.

Where in embodiments of the present invention reference is made to a "lens system", reference is made to at least one lens, for example a plurality of lenses laid out next to one another. Where in embodiments of the present invention reference is made to a "thin lens", reference is made to a lens with a compact design, for example a diffractive lens, a zone plate, a Fresnel lens, pillar lens systems, a microlens, or a portion of any of these. A thin lens may be, but does not have to be, integrated on or in the substrate. Where in embodiments of the present invention reference is made to "thin film lens", reference is made to a type of lens with a thickness of a few microns or less, for example 1 micron or less. Such thin film lenses may typically consist of a single layer of material. Thin film lenses are usually provided on the surface of a substrate. Microstructures which create a lens effect may be etched in, formed in or on, or attached onto the substrate. Examples of thin lenses are those formed by micropillars, or formed by layers in a particular structure, for instance a "staircase" shape, and other lenses obtained by lithographic methods. A group of thin lenses may be part of a "thin lens system". Equally, a group of thin film lenses may be part of a thin film lens system, which obvious is a thin lens system.

The lens system used in embodiments of the present invention may be part of an "optical system", which is a more general term encompassing a lens system and other optical components, such as refractive media like a transparent plate or the substrate to which the lens system is attached.

Where in embodiments of the present invention reference is made to a "detection system", reference is made to a group of one or more detectors for detecting radiation, for example radiation from a ROI that has been collimated by a lens system.

In a first aspect, the present invention relates to a collimating device for a particle sensor which sends excitation radiation (e.g. a radiation beam of visible light, such as a laser beam) from a radiation source to a ROI, the radiation being adapted to produce excitation on an analyte in the ROI. Analytes may be provided to the ROI via microfluidic channels. Any analyte crossing the ROI may emit radiation via predetermined and/or known mechanisms, such as fluorescence or scattering (e.g. forward scattering, backward scattering, etc.). The radiation emitted from the analyte in the ROI can go through an optical system, and can be focused and collimated to a detection system, for example to a remote detection system. Means for focusing and/or collimating may include thin lenses, for example one or more thin film lenses. The present invention includes a substrate integrating the means for providing analytes to the ROI and the means for focusing and/or collimating radiation emanating from the ROI. The substrate is preferably transparent or is provided with a cover which is transparent to at least the predetermined radiation that may be emitted from the ROI. For example, in case the radiation is known to be light, the substrate may preferably be transparent or have a part, e.g. a cover, transparent to radiation within the visible range. The substrate could also be tailored to be not transparent to particular wavelengths. For example, in some embodiments, only fluorescence may be interesting, and side-scattering or back-scattering may be removed by blocking radiation of the same or similar wavelength as the excitation beam. For example, some or all of the focusing means (e.g. the material forming the lenses) may absorb particular colors, for example the excitation radiation. Alternatively or additionally, a reflective coating may be used to reflect light of the lens, for example a filter between the lens and detector, e.g. a high OD (Optical Density) filter, so as to obtain good filtering in the already collimated beam.

In some embodiments of the present invention, the optical system comprises a glass sheet acting as refraction region, in which the radiation from the ROI travels and spreads. Other embodiments may comprise quartz, fused silica, etc. In some embodiments, a lens system comprising different thin lenses (e.g. Fresnel lenses with different designs, thin film lenses) may be attached to a surface of the substrate. The lenses may receive radiation (e.g. scattered radiation, luminescent, e.g. fluorescent, radiation, etc.) from particles in a ROI. For example, radiation may be emitted from a ROI, spread through the transparent substrate or part thereof, and be focused (e.g. collimated) by a lens system. Aside of thin film lenses, other types of lenses can be used (e.g. flat lenses), such as for example metasurfaces, high contrast transmit-arrays (HCTA), high contrast gratings (HCG), or microlens arrays.

In some embodiments of the present invention, radiation from a waveguide, optical fiber, or any other radiation carrying means, may be outcoupled into a ROI. An excitation grating, for example an outcoupling grating, can be used. Semiconductor waveguide photonics can be used for providing excitation radiation.

In some embodiments of the present invention, the collimating device is a modular, monolithic and disposable unit comprising a substrate (e.g. a transparent plate) and at least one thin lens, for example a thin film lens, which may form an optical system, for example a thin film lens system. At least one means for outcoupling radiation in a ROI, and at least one microfluidic channel adapted for providing analytes in a ROI, may be included in the collimating device. The optical system (e.g. the optical index of the substrate and/or the focal distances of the lenses) of the collimating device may be adapted to focus (or collimate or, in general, direct in a predetermined way) the radiation from a ROI to a remote detector. The collimating device may be a disposable, for example a single-use, device, separate from the detector. A second module, including expensive integrated circuits and sensors forming a.o. the detector, may advantageously be reused.

The radiation emanating from the ROI can be efficiently collected in a large area. The substrate thickness determines the spread of the radiation emanating from the ROI. If the lenses are provided at a main surface of the substrate opposite the side where the analyte is provided, for instance analyte at the top of the surface and lenses at the bottom of the substrate, the lenses may be larger than the collection zone at the other side of the substrate (e.g. larger than the channel in which the particles flow), thus improving efficiency. The space between the lenses and the detector(s), i.e. the distance between the lenses at the disposable unit and the detectors in the reusable unit, improves collimation. Alignment, e.g. vertical alignment in case an analyte is provided at a top side of a substrate and lenses are provided at a bottom side of the substrate, becomes less critical for obtaining an utilizable signal.

In some embodiments of the present invention, the collimating device comprises means for separating the radiation emanating from the ROI into separately detectable beams. For example, lenses may focus or collimate the radiation from a ROI into one or more detector systems, and each of them may be covered by a wavelength (color) filter. For example, the optical system may comprise means for separating and/or focusing (e.g. collimating) radiation from the ROI in different directions (for example, towards different detectors in a detection system), according to the wavelength.

For example, in a simple case, a first lens (e.g. a thin lens) can send radiation to a first detector over a first, e.g. green, filter, and a second lens may send radiation to a second detector over a second, e.g. red, filter. In this example, a lens system formed by two lenses may direct (e.g. focus, collimate, or converge) red light in a first direction (e.g. towards the first detector), and green light in a second direction (e.g. towards the second detector). In another embodiment, a lens system formed by four lenses (e.g. thin lenses, or more specifically thin film lenses) may separate a multispectral beam into four different beams with different directions, each beam characterized by a different range of wavelengths. In some embodiments of the present invention, the optical system may be optimized (by material choice and/or design) to transmit and collimate radiation, for example light from fluorescent sources, with little or no absorption for the wavelength or within a wavelength range, to a detector for being detected. The present invention is not limited to the enumerated features, and different or further elements may be included (e.g. filtering means for filtering or blocking the excitation radiation).

The present invention is not limited to fluorescence, and any other detection method which can use a source of light (e.g. laser) can be used in combination with fluidics, thin lens system and a detection system. For example absorption, light scattering or Raman scattering may be suitable techniques for the present invention.

In a second aspect, the present invention relates to a particle sensor comprising a collimating device according to embodiments of the first aspect, and a detection system. The detection system and the collimating device may be adapted to easily and/or automatically align the optical system with the detection system (e.g. by use of guides, anchoring means, temporary fixing means such as clips, etc.). In embodiments comprising optical systems in the collimating device which focus radiation from ROI to infinite (collimation), the system is very tolerant to errors in vertical alignment between collimating device and detection system. In some embodiments, the particle sensor is a modular sensor, in which the collimating device is a detachable (e.g. disposable) module and the detection system (e.g. an imager) is adapted to receive interchangeable detachable collimating devices. In alternative embodiments, the particle sensor is an integrated device, the detection system and the collimating device forming a single device.

In embodiments of the second aspect, the particle sensor, for instance the collimating device thereof, includes an optical system for separating radiation from a ROI into beams with different directions, according to their wavelength. The particle sensor may then comprise a plurality of detectors for detecting different wavelengths. Some embodiments of the particle sensor are able to separate radiation according to predetermined wavelengths or wavelength sub-ranges, into focused or collimated beams comprising radiation of different wavelengths, and collect them into separated detectors of a detection system. The means for beam separation may comprise diffractive lenses, e.g. thin lenses, embedded in or attached to the substrate of the collimating device. The detectors may have a large aperture, improving the overall sensitivity.

In some embodiments of the present invention, the collimating device and the detection system detect radiation of wavelength ranges different from the wavelength range of the excitation beam. This is a preferred embodiment for particle detectors based on fluorescence; for example the wavelength range of the excitation irradiation preferably does not overlap the wavelength ranges of the fluorescence emission of the analytes. Other elements, such as color filters and/or rejection filters, can be added for improving this separation and reducing overlap, thus reducing noise and false signals from reflections. For example, such filters may be placed in the space between the lenses of the collimating device and the one or more detectors of the detection system.

In those embodiments of the present invention where the analyte emits a plurality of wavelengths or one or more ranges of wavelengths, (via fluorescence, or scattering, or any other suitable mechanism), the optical system can be optimized to transmit and collimate different wavelengths or wavelength ranges, for instance each of the wavelengths or wavelength ranges, towards a different detector, for example by adapting each lens to each wavelength and aligning each lens to a different detector.

In some embodiments, the analyte may comprise cells which may be attached to fluorescent markers (e.g. biomarkers such as fluorescent proteins, fluorophores, etc.), in which case at least one type of analyte may be tagged in a mixture of particles, or alternatively different types of analytes may be tagged by a different types of dye each, or by combinations thereof.

The radiation separation according to wavelength ranges has the advantage of improving signal-to-noise ratio. The system utilizes a wide area of detection, thus collecting a high amount of radiation. For instance, lenses may send to specific detectors radiation only having a predetermined radiation spectrum, and other radiation (side-scattered radiation, backscattered radiation, noise signals from non-analytes) may be deflected away from the detectors. This is in particular useful because a flow may carry impurities and other non-analytes, which also may emit radiation, for example via back-scattering, which is generating noise.

Although embodiments of the invention are explained in detail referring to fluorescence, the present invention is not limited to fluorescence detectors. For example, side-scattering and forward scattering may be also detected. Scattering radiation may be deflected to a different specific detector (e.g. a side-scattering detector, a back-scatter detector for radiation with similar wavelength as the excitation radiation, etc.). For example, in case of fluorescence cytometry, a system may comprise lenses for directing beams within the fluorescence spectrum to fluorescence detectors, and further a lens sensitive to the same (or close) wavelength of the excitation beam, the lens adapted to direct such radiation to a specific scattering detector. Such detectors advantageously provide particle discrimination: if a particle is detected in such scattering detector, but not in any of the other fluorescence detectors, it can be assumed that it is a non-stained particle, e.g. an impurity. Using a similar principle, a lens and detector may be positioned relative to the ROI and the excitation grating, such that side-scattering can also be detected.

An additional advantage is that the particle sensor may be compact because the substrate may contain, in a first surface facing the detection system, the lens system, and in a second surface or embedded within the substrate, means for providing analytes into the ROI. Thus, the distance between the ROI and the lenses can be fixed, by the thickness of the substrate. The means for providing analytes can be e.g. a channel or microchannel, which may be etched, ground or somehow produced in or on the substrate. Alternatively or additionally, a microchannel may be formed by the substrate, and side walls and a lid, or by a transparent separate conduct attached to the surface of the substrate.

Figure 1:
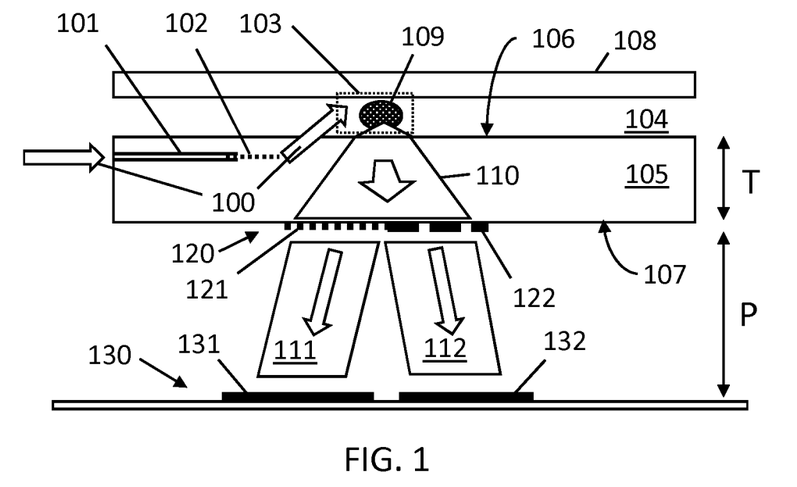
FIG. 1 illustrates a side view of a sensor according to embodiments of the present invention, in which delivery means for delivering analytes into a region of interest, a photonics system with a radiation carrier for carrying radiation into the region of interest, and a lens system for collimating radiation from the region of interest to a remote detection system are all provided at a same substrate.

In embodiments of the present invention, as shown in FIG. 1, an irradiation source (not illustrated) may provide radiation 100 to be used as probe beam via a radiation carrier 101. The carrier 101 may be, for example, a waveguide such as a silicon waveguide, a strip or rib waveguide, a multilayer structure comprising metal and SiN layers, an optical fiber, etc. The carrier may comprise at least one excitation grating 102, e.g. comprising mirrors, for outcoupling and directing the excitation beam 100 into a ROI 103.

Delivery means 104 for providing a particle inside the ROI 103 may be included, for example a microchannel, e.g. a microchannel of width of 50 microns or less. The channel 104 may be embedded inside a substrate 105, or alternatively, as shown in FIG. 1, the channel 104 or microchannel is provided on the surface 106 of the substrate 105 opposite to the surface 107 containing a lens system 120, and a cover 108 (e.g. a lid, a transparent lid, etc.) may be also provided for enclosing and protecting the fluid in the delivery means 104.

The delivery means 104 and substrate 105 containing the lens system 120, and optionally the cover 108, may form a separate interchangeable and disposable module, according to embodiments of the present invention.

Once a particle, such as an analyte 109, enters the irradiated, e.g. illuminated, ROI 103, a radiation signal 110 is generated, e.g. incoherent radiation. The generation may be provided via scattering mechanisms, fluorescence, Raman relaxation, or any other suitable mechanism. A portion of this radiation travels downwards the transparent substrate 105 and encounters the surface 107 comprising the lens system 120 comprising e.g. thin film lenses 121, 122. These lenses deflect radiation 111, 112 to each of the different detectors 131, 132 in a detection system 130 separately, according to the different wavelengths or wavelength ranges of radiation wavelength comprised in the radiation signal 110.

Figure 9:
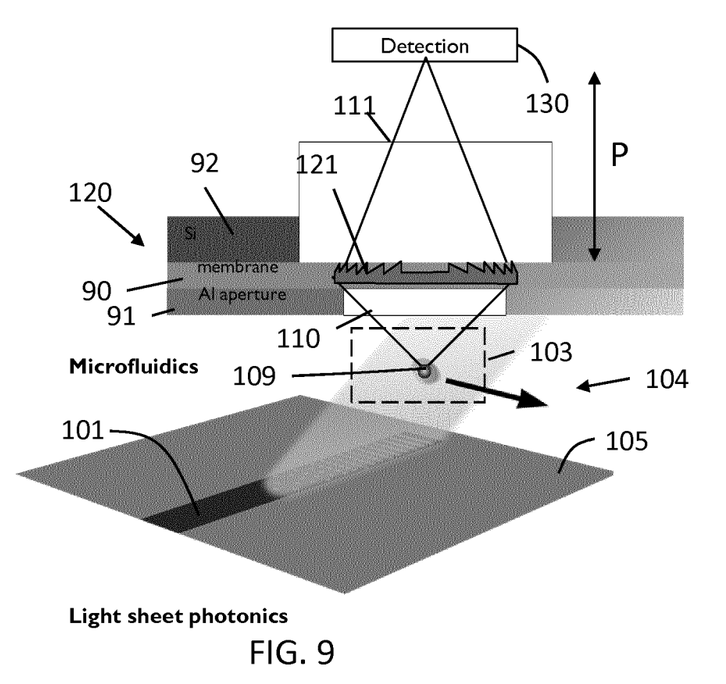
FIG. 9 illustrates a side view of a sensor according to embodiments of the present invention, in which delivery means for delivering analytes into a region of interest, and a photonics system with a radiation carrier for carrying radiation into the region of interest are provided at a same substrate, while a lens system for collimating radiation from the region of interest to a remote detection system is provided separate from that substrate.
Figure 10:
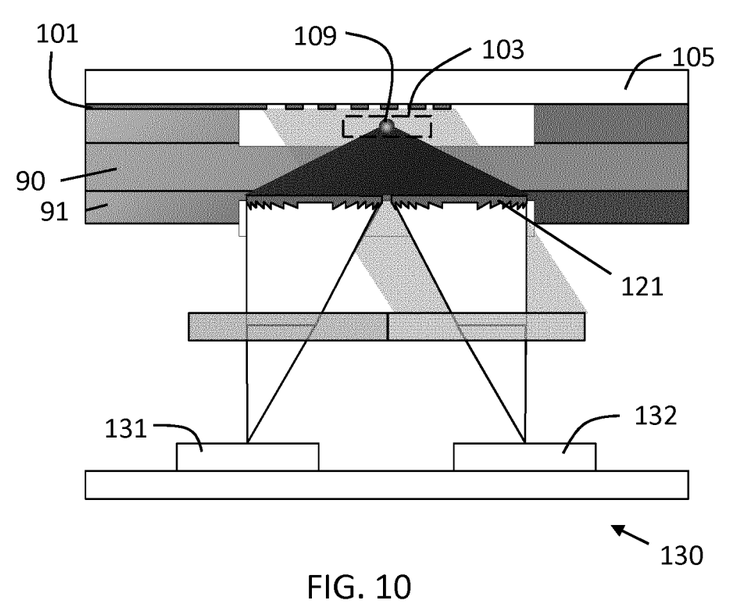
FIG. 10 illustrates a side view of a sensor according to embodiments of the present invention, where the lens system is provided on a substrate separate from the substrate on which the photonics and the microfluidics components are provided, adapted for detection of multiple wavelengths.

In alternative embodiments, as for instance illustrated in FIG. 9 and FIG. 10, the radiation carrier 101 and the delivery means 104 for providing a particle inside the ROI 103 may be provided in a same substrate 105. The lens system 120, however, may be provided on a separate substrate, for instance on a membrane 90. The separate substrate, for instance membrane 90, may be provided with an aperture 91, such as for instance an Al aperture. The membrane 90 and the aperture 91 may be provided on a carrier substrate 92, for ease of handling. The carrier substrate 92 may be of any suitable material, for instance a semiconductor substrate like for example a silicon substrate. It may be an advantage of providing a separate chip with the lens system, because fabrication may be simpler. The integrated embodiment, on the other hand, has the advantage that the different components are aligned without particular requirements on the assembly.

Functioning of an optical excitation system according to embodiments of the present invention is similar, whether the lens system is integrated in or on the same substrate as where the delivery means and the radiation carrier are present, or whether it is provided on a separate substrate. In the example of FIG. 9 and FIG. 10, contrary to the embodiment illustrated in FIG. 1, once a particle, such as an analyte 109, enters the irradiated, e.g. illuminated, ROI 103, a radiation signal 110 is generated, e.g. incoherent radiation. The generation may be provided via scattering mechanisms, fluorescence, Raman relaxation, or any other suitable mechanism. A portion of this radiation travels upwards, away from the substrate 105 and encounters the lens system 120 on the separate substrate 90, the lens system 120 comprising at least thin film lens 121. The lens system deflects and collimates radiation 111 to at least one detector 131, 132 in a detection system 130.

For the different embodiments of the present invention, the detection system 130 may be adapted to receive particular wavelengths or wavelength ranges. It may be used to simply discriminate between different radiation wavelengths emitted from the ROI, for example for counting and classifying particles flowing through the ROI (e.g. different fluorophores attached to respective different cells in a cell cytometry setup). Additionally, it may be used to obtain images with a predetermined resolution, for example using detectors with high resolution, or obtaining the image by time traces with high temporal resolution. For example, the present invention allows obtaining fluorescent images of cells with subcellular resolution, by combination of fluorescent detectors and an excitation radiation adapted to illuminate the particles crossing the ROI with a predetermined resolution (e.g. a thin light sheet with a known thickness) and image the fluorescence received by the detectors. A suitable detection system may comprise CMOS fluorescence detectors, for example, or any other suitable radiation detector. A suitable detector may advantageously provide fast readout and large aperture, for example the detector may be adapted to receive the image, formed by the lens, of the analyte (e.g. the image of a cell). Such suitable detectors may comprise CCD pixels, avalanche photodiodes, photomultipliers (e.g. Si-PMT), etc. The relatively big distance between the ROI 103 and the detectors 131, 132 of the detection system 130, the wide aperture of the optical system formed by the transparent substrate 105 and the efficient thin lens system 120, allows the use of ample detector surfaces, enabling collection and detection of a great amount of scattered radiation, utilizing most of the radiation emitted by the analyte, hence increasing the overall efficiency of the sensor. In embodiments of the present invention with integrated lens system, a good tradeoff must be reached between the desired spread of the radiation from the ROI 103 in the substrate 105 and the absorption of the substrate material. The transparent substrate 105 may, for example, comprise $SiO_2$, or a glass sheet, or transparent polymer of a determined thickness T between the opposite surfaces 106, 107 of the substrate 105. For example, the substrate 105 may comprise a thickness of at least 300 microns, for example 500 microns. A 700 micron glass sheet can be used, for example. This distance T can be optimized according to optical needs, for example according to the focal distance of the lens system. For example, it can be optimized taking into account the numerical aperture of the lens system and/or the detection system, and the size of the ROI and/or the expected analytes and/or the height of microchannels included in, or on, the substrate. For example, the thickness of the substrate may be at least ten times the height of the microchannel.

The distance P between the lens system and the detectors (e.g. between the surface 107 comprising lenses and the detection system 130) may be tailored for a compact design and good optical transmission, taking into account the minimum distance required between the individual detectors 131, 132 in case circuitry needs to be fit therein, or for avoiding cross-signal or bleeding. For example, it may be about 300 microns or more. In some embodiments, the distance may be between 300 µm and 4 cm, for example about 0.2 mm, or about 2 cm, the present values not limiting the present invention. For example, in some embodiments, the total distance P+T (not explicitly illustrated in FIG. 9) between the channel and detector system (or between the waveguides and the detector system) is at least one micron, for example ten microns. In embodiments in which the thin lenses provide collimation, a good compromise between good collimation and design needs may result in distances P of a few hundreds of micrometers. The substrate 105 may be placed between the ROI 103 and the lens system 120, thus the lenses 121, 122 of the lens system 120 collimate radiation travelling "downwards" from the ROI 103, i.e. towards the substrate 105, as illustrated in FIG. 1. In alternative embodiments, the ROI 103 may be placed between the substrate 105 and the lens system 120, thus the lenses of the lens system 120 collimate radiation traveling "upwards" from the ROI 103, i.e. away from the substrate 105, as illustrated in FIG. 9 Further filters (wavelength filters, color filters, rejection filters such as optical notches) may be included in the space between the lenses 121, 122 of the lens system 120 and the detectors 131, 132 of the detection system 130.

The detection system 130, upon receipt of signal 111, 112, produces an electrical signal characteristic of the wavelength it receives. For example, if radiation is received by a given detector 131 but not by other detectors 132, the wavelength of the radiation 111 would be unambiguously determined as within the range that the lens 121 is responsive to. Once said radiation 111 excites the detector 131, an electrical signal may be generated and sent to an output, such as a memory in a data unit, a processor, a display, etc. The detection system 130 may be part of an integrated chip, a pixel array, a photonics circuit, etc.

In an exemplary implementation, a cytometer used to count stained cells can be obtained. For example, two different cell populations may be stained with two different fluorescent biomarkers of characteristic wavelengths $\lambda 1$ and $\lambda 2$. When a cell marked with a first biomarker is illuminated by the excitation beam 100, the fluorescent biomarker emits radiation 110 at a wavelength $\lambda 1$, which upon reaching the lens system 120, is directed (e.g. collimated, or focused) into a single beam 111 which is detected only by detector 131 of the detection system. When a cell marked with the second biomarker is illuminated by the excitation beam 100, the radiation 110 emitted will have a wavelength $\lambda 2$, which is directed towards the detector 132 by the lens 122 of the lens system 120. If a third cell, stained by both markers, is illuminated, it would be detected simultaneously by two of the detectors 131, 132. Back-scattered light with the same wavelength as the excitation radiation, or close to it, would be filtered out but the lens system 120, and would not be detected by the detection system 130.

Figure 2:
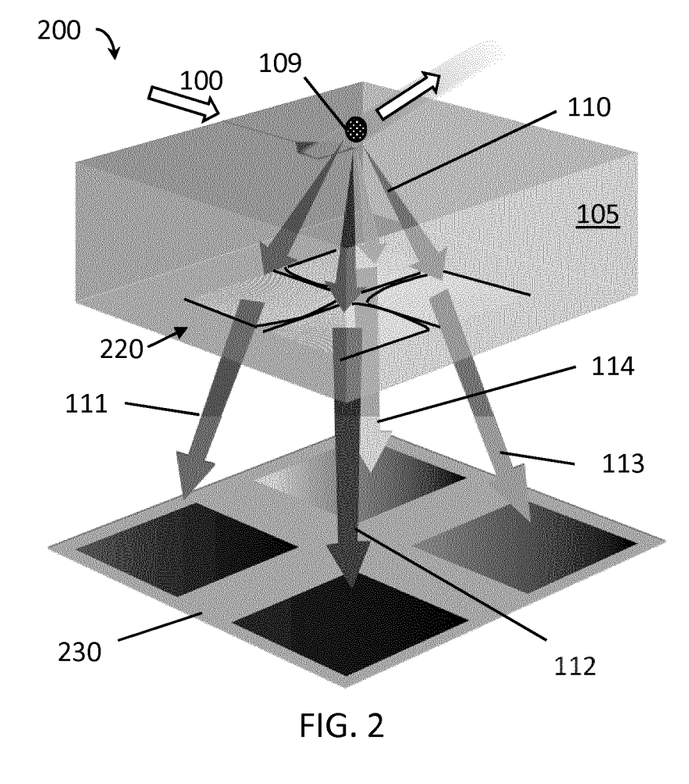
FIG. 2 illustrates a perspective view of a lens and detection system configuration according to embodiments of the present invention.

FIG. 2 shows an example of a lens system 220 comprising four Fresnel thin lenses. Upon radiation of the analyte 109, scattered radiation 110 is transmitted through the transparent substrate 105. When the radiation 110 reaches the lens system 220, four different thin lenses (e.g. Fresnel lenses), in the example illustrated, can direct the radiation towards up to four different directions, effectively generating up to four radiation beams 111, 112, 113, 114, containing different wavelength ranges, in four different directions toward four detectors of a detection system 230. A high flexibility of biomarkers can be used, because up to four different wavelength ranges may be discriminated in a compact design. The number of lenses of the lens system 220 and the number of detectors of the detection system 230 is four in the example illustrated, but the present invention is not limited to this number of lenses and detectors; any suitable number of lenses and detectors can be implemented, depending on the intended application. Typically the number of lenses may be identical to the number of detectors, but also this is not required. There may be more lenses than detectors, or there may be more detectors than lenses.

The sensor implementing a lens system 200 as described, thus can classify a signal produced by an analyte 109 that enters the ROI, before the signal even reaches the detection system 230. Different analytes 109 having attached different biomarkers, or combinations thereof, may be detected by separating the wavelength contributions with the lens system 220.

Figure 3:
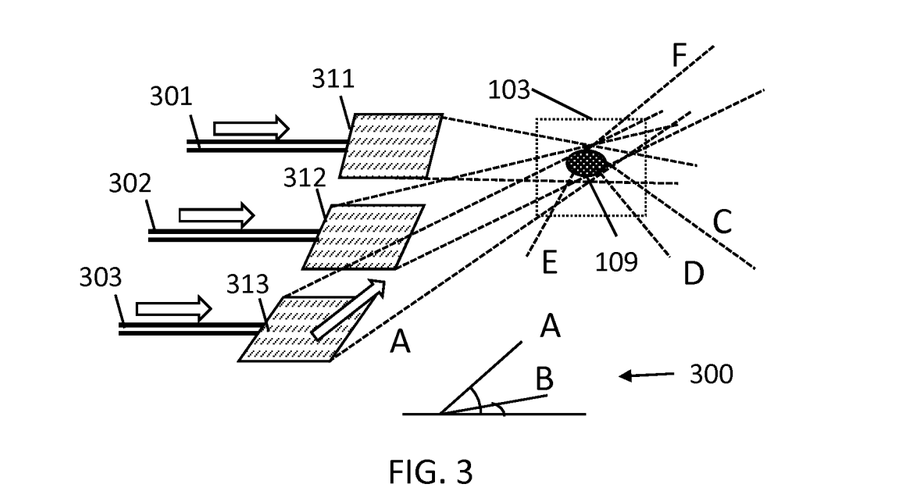
FIG. 3 illustrates a perspective view of a configuration for excitation gratings and different emission directions.

The present invention is not limited to one excitation beam 100. For example, FIG. 3 shows several waveguides 301, 302, 303 comprising an excitation grating 311, 312, 313, respectively. Each grating may direct an excitation beam into the same ROI 103. For example, excitation beams with three different wavelengths may be used (e.g. red, green and blue laser modes), providing multispectral excitation to particles entering in the ROI 103. In the case shown in FIG. 3, point-detection is used, thus each grating 311, 312, 313 may be adapted, e.g. oriented, so the incident light enters the ROI 103. This implementation has the advantage of allowing the use of simple optics. The beam can be oriented with the incidence direction A and the azimuth direction B, which can be different for the each grating. The beam directions A and B are shown in the diagram 300 for direction of the excitation radiation outcoupled by the grating 313.

When a marked analyte receives excitation radiation, not only fluorescence is emitted. Additionally, forward and side-scattering usually take place. Particular emission directions F, C, D and E are shown in FIG. 3 and the diagram 400 of FIG. 4.

Forward-scattered radiation can be defined as the radiation emitted in a direction close to the excitation beam direction. For example, the radiation with a direction F forming an angle of (plus or minus) 10 to 15 degrees with direction A is considered forward-scattered radiation. Side-scattered radiation can be defined as radiation, emitted by the analyte 109, with a direction with respect to A forming an angle higher than F and, at most, perpendicular to A, such as direction D. Thus, scattering with directions within an angle between directions C and D (taking into account the refraction of the substrate) may be considered detectable side-scattering. Radiation emitted in a direction with an angle between the angles of direction D and a predetermined direction E, thus in an obtuse angle with the direction A, can be considered detectable back-scatter radiation. Fluorescence emissions within the angles formed by directions D and E will be deflected by the lens system towards the fluorescent detectors.

Direction D may be chosen as the direction perpendicular to the direction A, while directions C and E may be determined by optical considerations, such as the optical path between the ROI and the lenses aperture. Direction D may also be defined as the maximum angle of usable radiation detectable by a side scattering detector, thus being also determined by optical considerations.

Figure 4:
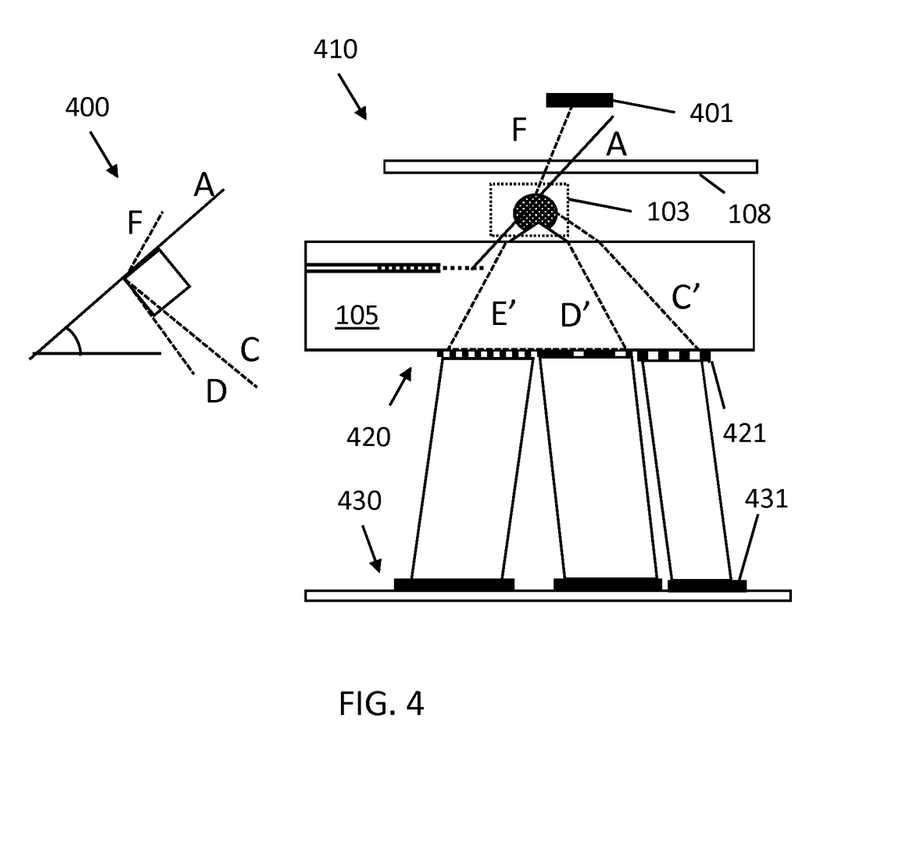
FIG. 4 illustrates a scatter diagram and a side view of a sensor according to particular embodiments of the present invention comprising a forward- and side-scattering detectors.

An example of implementation with side-scatter and forward-scatter detection is shown in the rightmost drawing 410 of FIG. 4. The radiation emitted from an analyte in the ROI 103 in a forward direction F is collected by the forward-scatter detector 401, which may be situated outside and on top of the substrate embedding the channel or on top of lid 108, which is transparent for the scattered radiation. Refraction of the forward scattering path F should be taken into account for the positioning of the detector 401. Detectable side-scattered radiation (having an angle between the angles formed by C and D with the incidence direction A) and back-scattered radiation (with directions between D and E) will be refracted by the substrate 105. Side-scattered radiation between the (refracted) directions C' and D', and back-scattered radiation and fluorescent emissions between (refracted) directions D' and E', will be focused by the lens system 420. Specifically, fluorescent radiation will be directed (e.g. focused, collimated) to fluorescence detectors, as in FIG. 1 or FIG. 2, while side-scattered radiation shall be focused (e.g. collimated) by the lens 421 to the side-scatter detector 431. The sensitivity of particle presence detection can be increased. Additionally, the system of FIG. 4 may be used to improve particle discrimination and obtaining information regarding the size, roughness and internal complexity of an analyte. Additionally, an unstained particle (e.g. a cell with no biomarker) would not emit fluorescence. In embodiments such as the ones shown in FIG. 4, these particles may still be detected by side-scatter lenses 421 and detectors 431 and, optionally, by forward-scattering detectors 401. Typically, the excitation wavelength will be between about 30 and 150 nm away from the emission wavelength, depending on the staining, the cell type, the excitation radiation, etc. In some cases, non-fluorescent back-scatter radiation may reach the lens system, but because only particular ranges of wavelength may be collimated, the amount of back-scattered non-fluorescent light detected by the fluorescence detectors may be very small. If, in a particular set-up, any radiation with similar wavelength (or within the wavelength range) of the excitation radiation could be collimated in the lens system, it can be advantageously blocked from entering the detectors, for example using filters between the lens system and the detector, as already discussed. Side scattering detectors may also be placed next to forward scattering detectors, depending on the angle of emission with respect to the angle of incidence of the excitation beam. Other detectors can also be added. For example, this configuration is readily compatible and integrable with other analysis systems, such as holographic systems.

Point-detection normally relies in a particle entering the ROI in a limited portion of a channel. The relative sizes (e.g. volume, or cross section area) of the ROI and the analyte are comparable. Other illumination configurations may be possible depending on the type of grating. For example, it is possible to obtain focused or collimated beams, perpendicular or, as shown in FIG. 4, angled beams, or a light sheet as will be shown in the following embodiments. For example, the ROI may cover the whole width of the channel or microchannel, and a light sheet may be used for exciting any analyte 109 crossing the ROI 103.

In a second aspect, the present invention relates to a modular sensing system for detecting radiation, e.g. fluorescent radiation. Such a sensing system typically comprises a plurality of sensors as described in the first aspect, for example each comprising a first, e.g. reusable, detection module, and a second, e.g. disposable, module that comprises the optical system and the microfluidic channels. The sensing system can be coupled to at least one irradiation source or radiation carrier for generating an excitation radiation beam for exciting the particles to be characterized. Such an irradiation source typically may be a laser system, although embodiments are not limited thereto. Other components that typically may be present in such sensing system are known by the person skilled in the art. A sensing system according to embodiments of the present invention may comprise at least one ROI and at least one lens in at least one lens system, for directing radiation to at least one detector of at least one detection system. Said modular system may be inexpensive, it may be completely disposable or only a part thereof may be disposable (e.g. the substrate with the microfluidic channel and lens) and it may be highly specialized.

A sensing system according to a further embodiment of this aspect of the present invention may comprise a plurality of ROIs, thereby providing multiple excitations to a particle, e.g. an analyte. A plurality of excitation beams may be sent to each ROI, and a plurality of detectors and/or detection systems may receive radiation from each ROI. Signal discrimination may be provided by means according to embodiments of the first aspect, e.g. by including a filter on each detector or detection system, or by directing the radiation to a different detector according to their wavelength.

Figure 5:
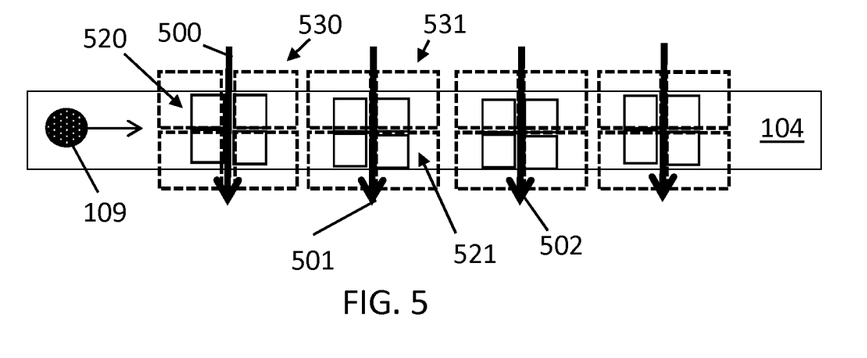
FIG. 5 illustrates a top view of a sensing system according to embodiments of a further aspect of the present invention comprising multiple measurement stages.

FIG. 5 shows a channel 104 and a plurality of excitation beams 500, 501, 502, spread in a substantially bi-dimensional beam (e.g. a light sheet) covering the width of the channel 104. The plurality 500, 501, 502 of excitation beams may have a plurality of different excitation wavelengths and are illuminating a plurality of ROIs, creating several measurement stages. When an analyte 109 crosses a beam 500, it may emit radiation (via scattering, fluorescence, etc.), which is collected by the lens system 520 at the bottom of the substrate and directed to a detector. For example, the radiation may be focused or collimated, depending on its wavelength or its range thereof, to a corresponding detector of a detection system 530, according to embodiments of the first aspect of the invention. The analyte may cross multiple ROIs and be excited with different radiation beams, increasing flexibility and tuning capabilities.

A great number and combinations of fluorescent markers can be used in a single flow. A plurality of excitation radiation beams can be optimized for each of the markers used, for example NIR lasers, red lasers, blue lasers, etc. Those cases in which a marker or a combination of markers emit fluorescence at a particular wavelength range, depending on the incident excitation, can be accurately studied and labelled using a plurality of incident excitation beams.

In the embodiment shown in FIG. 5, each excitation beam is arranged on top of an optical system comprising a lens system 520, 521 and has underneath a detection system 530, 531. In alternative embodiments, the lens system may be a continuous system formed by a plurality of lenses extending along the whole channel 104. Likewise, a single detection system underneath, and extending along, the channel 104 may comprise a plurality of detectors for receiving signals from each corresponding lens of the single lens system.

Although a preferred embodiment of FIG. 5 has been shown with respect to light sheets, discrete ROIs can be used instead of, or in addition to, light sheets, along a microchannel. Additional forward-scattering and side-scattering detectors may also be added (not shown in FIG. 5).

In case of a high number of particles, in order to properly label each and reduce the risk of double detection and other experimental artifacts, the speed of the particles must be known. In these cases, flow and flow velocity should be accurately measured. For example, in case of micro-channels, laminar flow should be taken into account in order to sort out faster particles travelling near the center of the microchannel from slower particles near the channel walls.

The sensing system may be have parallel configuration, for example comprising a plurality of channels such as the one shown in FIG. 5. Parallel configuration of the channels increases the speed of measurement, because a higher number of analytes can be analyzed in parallel. This, in turn, improves the accuracy because the processing is relaxed and the concentration of analytes in each microchannel can be reduced. A high number of channels utilizes better the area, which is economically advantageous in case of devices integrated in a chip.

Figure 6:
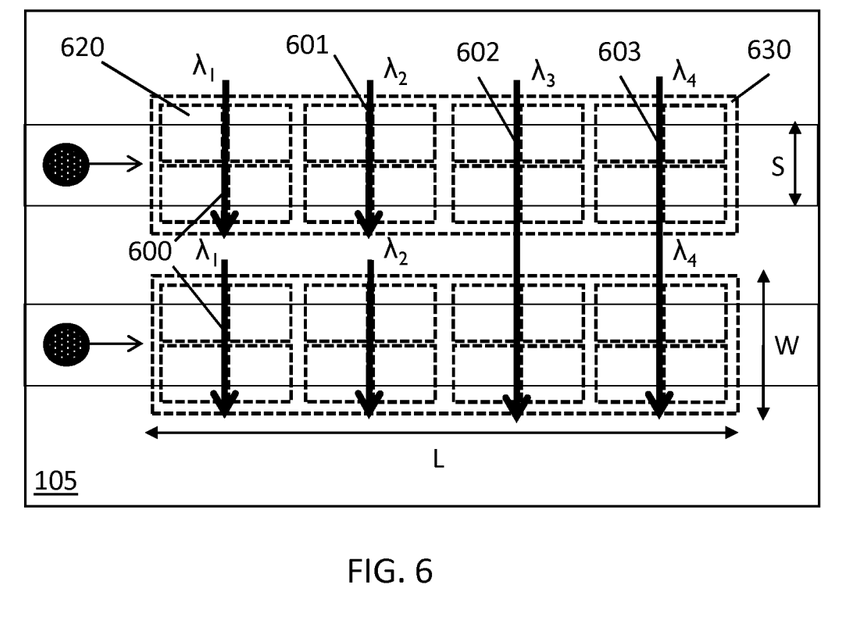
FIG. 6 illustrates a top view of a parallel sensing system according to embodiments of the present invention comprising multiple measurement stages.

FIG. 6 shows a parallel system comprising light sheets 600, 601, 602, 603 as excitation beams with four different wavelengths. Particles may travel, e.g. flow, through a plurality of channels, and parallel measurements can be performed in all channels simultaneously. Some exemplary dimensions of the elements are shown in FIG. 6. The section S of the microchannel may be have a rectangular or square shape of 50 microns of side. The width W of the detector unit may be 250 microns. A plurality of detector units, for each ROI, may be used, or all detectors may be integrated in a single unit of length L of for example 1 mm, or in general between 300 µm and 2 cm.

The lens system 620 may be as wide as possible, thus utilizing the area of the substrate surface and collecting most of the light from the ROI. For example, it may be wider than the channel, but it may be as big as the channel. Embodiments of the present invention are not limited thereto, and the lens system may even be narrower than the channel, as shown in FIG. 5. The width W of the detection system 630 is preferably larger than the ROI, e.g. larger than the channel.

Figure 7:
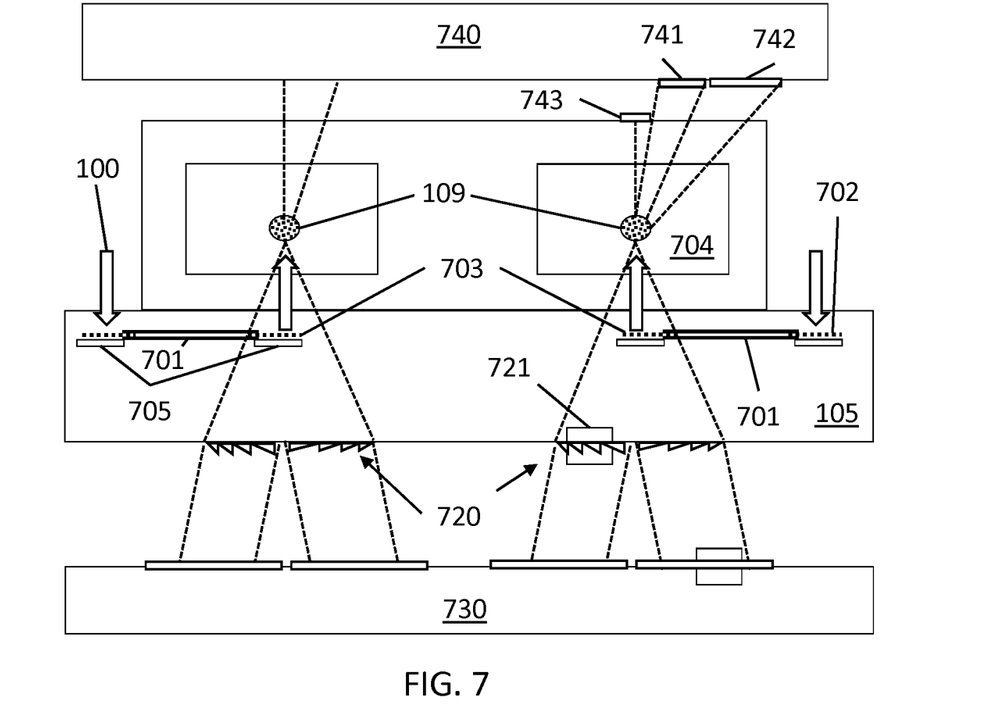
FIG. 7 illustrates a front view of an embodiment of a parallel sensing system including forward and side scattering detectors, according to embodiments of the present invention.

FIG. 7 depicts the frontal view of a sensing system, rather than the view along the channels or the top view. The excitation beam 100 may be introduced in the excitation waveguides 701 via a coupling grating 702 and then, via a second coupling grating 703, into the channel 704. The coupling gratings 702 may be of any suitable type, for example it may comprise mirrors 705. The radiation interacts with the analyte 109, which in turn emits radiation (for example, the fluorophores attached to the analyte emit fluorescence when illuminated). Part of the radiation emitted by the particles 109 travels backwards, through the transparent substrate 105. It crosses the diffractive lens systems 720 and, depending on its wavelength, it is collimated by each lens to one or other detector in a CMOS fluorescence detector 730. If the emitted radiation is multispectral, each lens may collimate or focus each wavelength component included in the emitted radiation to a different detector. As before, side-scattering detectors may be included.

This system comprises an optional CMOS forward/side scatter detector 740, for example comprising dedicated forward detectors 741 and dedicated side detectors 742. Alternatively, it may be a full lens-free image detector. Other detection, imaging and optical systems can be further included, such as a beam stopper 743 for blocking transmitted radiation, filters, lenses, etc.

In what follows will be described how the thin lens of the lens system 720 only interacts with radiation within a predetermined wavelength or range of wavelengths.

Figure 8:
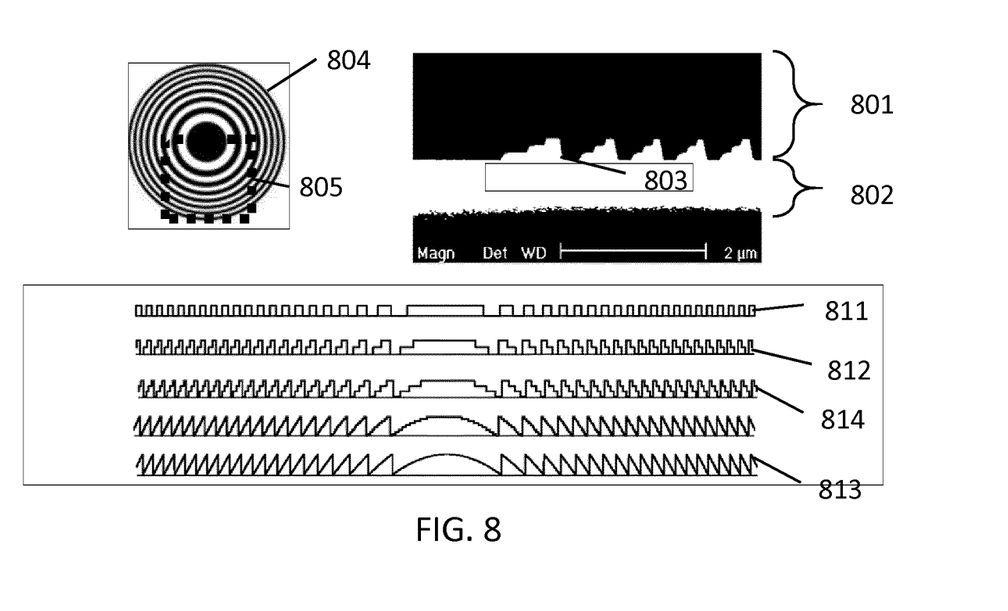
FIG. 8 illustrates the top view and side views (profile views) of a microstructured thin lens as may be used in embodiments of the present invention.

The micrograph 800 of FIG. 8 shows a detail of a diffraction lens 721 of FIG. 7. The lower portion 801 has a low diffraction index, and the upper portion 802 has high diffraction index. The ridges 803 may be stepped structures with a height optimized for collimating or focusing a predetermined wavelength or wavelength range. The size of the steps can be optimized accordingly to the wavelength. Shorter steps are preferred for shorter wavelengths. The part of the radiation with a wavelength outside the "collimation range" may not be collimated, and it may enter in different diffraction modes, thus missing the detector. The structures and areas surrounding the chip and detector may be covered with a blocking layer, to block (e.g. absorb) this strayed diffracted radiation; for example they may comprise blackened structures.

Different profiles may be used for the ridges 803. In general, the ridges of a lens 811, or two steps 812, or more steps, or the ridges of a lens 813 may be smooth (e.g. when the number of steps increases indefinitely, for the same height). The top view of a Fresnel lens may be circular, as shown in the left drawing 804 of FIG. 8. In some embodiments, each of the lenses 121, 122 of a system 120 as shown in FIG. 1 may comprise a portion, for example a half, a quadrant, or in general a predetermined region 805, preferably comprising part of the central ridge, of a complete circular lens 804 as shown in FIG. 8. For example, a lens system may comprise four quadrants of circular lenses with different ridge parameters (ridge heights, separation and number of steps), each of the lenses having the parameters (e.g. the ridge height) optimized for collimation of a different wavelength range. The shape of lenses of a system may be square, oval, rectangle, etc., and they may be part of a Fresnel lens, e.g. a circular Fresnel lens, for example. The lenses may be arranged in a square system as shown in the systems 220, 520, 620 of FIG. 2, FIG. 5 and FIG. 6. Other shapes, such as circular, rectangular or oval systems, may be preferred in some embodiments of the present invention.

Embodiments of the present invention disclose a sensing system that obtains collimation of radiation on different directions according to its wavelength, using different lenses adapted for such collimation. Additionally, thin lens systems may send the radiation from the ROI, without wavelength discrimination, to different detection systems comprising detectors, each comprising a band-pass filter for allowing only wavelengths from different ranges to be detected.

In a third aspect, the present invention relates to a process to obtain a thin lens system on a substrate, for example a chemically inert substrate such as glass (lime-soda glass, fused quartz, etc.), or a polymeric transparent substrate, such as poly (methyl methacrylate).

In accordance with embodiments of the present invention, on one surface of the substrate, a lens system is provided. The lens system may comprise for example a plurality of Fresnel lenses. Other suitable thin lenses may comprise micropillars, metasurfaces, high contrast transmit-arrays (HCTA), high contrast gratings (HCG), or microlens arrays. In one embodiment, the lens in on the surface facing the analytes. In preferred embodiments, the at least one lens is in or on the surface facing the detector.

In particular embodiments, a thin lens system can have a fixed, very accurate or perfect alignment with the channels of the fluidic system, and even further with the outcoupling means (e.g. excitation gratings) of the radiation carriers, in particular because the thin lens system can be integrated in the same substrate as the channels of the fluidic system and the waveguides. The alignment of the optical system can be made easier. However, it is not intended to limit the present invention to systems with lens systems comprising at least a first thin lens integrated in or on the substrate for collimating radiation from the at least one region of interest to a remote detection system.

Further, a thin lens system is compact enough for allowing a high degree of parallelization and for scaling up the number of detection sites.

It is also possible to have different structures in one layer, which can be optimized for different wavelengths. It is also possible to provide different flat lens layers, which increases the design flexibility and improves orientation of the beam.

According to some embodiments of the present invention, the lenses may comprise "Fresnel zone plates", in which Fresnel zones are spaced taking into account the wavelength which will be used in the particular application. The Fresnel zone plate, which is well known in the art, focuses light using diffraction, blocking waves with opposite phase and enhancing constructive interference at a desired focus distance.

Alternatively, "phase Fresnel" lenses can be used, in which the phase of the light is shifted when it crosses the material, thus generating constructive interference. A phase Fresnel lens comprises microstructured grooves. The microstructures may comprise thin-film barriers with staircase shape, such as the ridges 803 of FIG. 8. Groove separation and the dimensions of the step can be optimized to the wavelength used in the device. The thickness can be calculated according to the relationship:

$$\text{thickness} = \frac{l\lambda_0}{N\Delta n}$$

where $\lambda_0$ is the wavelength of the light, N is the number of steps in each microstructure, l is a value between 1 and N, and $\Delta n$ is the optical index difference between the exterior and the material of the lens (for example, the index difference between the high index material and the low index material surrounding the high index material, for example the material that fills the grooves that were etched into the high index material). The efficiency of such thin film lenses can be directly obtained from the number of steps N:

$$\eta = \left(\frac{\sin(\pi/N)}{\pi/N}\right)^2$$

The more steps, the better the collimation (e.g. high intensity on the focus point can be obtained), but the process increases in complexity and the error tolerance decreases. Staircase structures of three steps (such as the third ridge structure 814 shown in the lower drawing of FIG. 8) or four steps present an efficiency between approximately 0.7 and 0.8 (in a scale of 0 to 1), which is a good tradeoff between complexity of production and good collimation and/or focusing properties.

The thin-film barriers with staircase shape may be formed by one, two, three or more deposition steps, for example with 4 steps thereby obtaining a four-stepped staircase microstructure.

The lenses can be formed by generating microstructures on the surface of a sheet (e.g. semiconductor like silicon), attaching the microstructures to the surface of the substrate, and optionally removing the remaining of the sheet. According to some embodiments of the present invention, semiconductor lithographical fabrication techniques can be used. For example, the fabrication may comprise deposition of layers of material, e.g. with masking, for forming the grooves. Alternatively or additionally, the grooves may be formed by etching, for example by etching high index material. Other methods, such as direct engraving on the substrate, may be used. The microstructures may be generated by any known technique, such as engraving, ablation, etching such as deep reaction ion etching, masking and etching, etc. Pillars may be used but it is difficult to implement for the same tolerances, and it is lithographically challenging.

The shape and size of the structures can be adapted for collimation. For example, the exact size of each barrier, as well as separation between barriers, can be adapted to collimate a given range of wavelengths. For example, the height of the staircase in function of the wavelength is given in the previous thickness equation. For example, the separation of the staircase depends on the numerical aperture of the lens and the wavelength: the shorter the wavelength, the shorter the separation.

Sensors and sensing systems according to embodiments of the present invention have proved effective for collection of radiation from analytes. Trials performed in fluorescence cytometry with lasers have obtained a good signal to noise ratio. For example, in a system with a sampling speed for 20000 cells per second, at a sensitivity of 100 molecules of equivalent soluble fluorophore (MESF), approximately 600 photons reach the detector. The sensor output shows a current of $3.26 \, 10^{-11}$ A, and a noise current of $3.21 \, 10^{-12}$ A. Thus, the signal-to-noise ratio can reach a value of 10.13, for a rate of 20000 cell/s.

The invention claimed is:

1. An optical excitation system for a particle sensor, the system comprising:
    (a) a substrate comprising
        at least one delivery means for delivering analytes into at least one region of interest, and
        at least one radiation carrier for carrying radiation and directing at least one radiation beam from the at least one radiation carrier into the at least one region of interest; and
    (b) a thin lens system comprising at least a first thin lens for collimating radiation from the at least one region of interest within a first range of wavelengths comprised in the radiation to a remote detection system the first thin lens having a thickness of one micron or less.

2. The optical excitation system according to claim 1, wherein the at least a first thin lens is integrated in or on the substrate.

3. The optical excitation system according to claim 1, wherein the thin lens system comprises at least one thin film lens.

4. The optical excitation system according to claim 1, wherein the at least one delivery means comprises at least one microfluidic channel.

5. A particle sensor comprising:
    an optical excitation system according to claim 1; and
    a detection system comprising at least a first detector for detecting radiation within the first range of wavelengths.

6. The particle sensor according to claim 5, wherein the thin lens system of the optical excitation system is adapted to allow transmission and direction of radiation within the first range of wavelengths from the region of interest into the detection system.

7. The particle sensor according to claim 5, wherein the thin lens system of the optical excitation system comprises at least a second thin lens for detecting radiation within a further range of wavelengths,
    wherein the particle sensor further comprises at least a second detector part of the detection system, for detecting radiation within the further range of wavelengths, and
    wherein the thin lens system is adapted to direct radiation within the first range of wavelengths towards the first detector, and radiation within a further range of wavelengths to the second detector.

8. The particle sensor according to claim 7, wherein each of the thin lenses of the thin system is adapted to collimate radiation of different ranges of wavelengths from a region of interest to a different detector of the detection system.

9. The particle sensor according to claim 5, wherein the thin lenses of the thin lens system are positioned on a surface of the substrate between the delivery means and the detection system.

10. The particle sensor according to claim 5, further comprising at least a further thin lens and a further detector, the thin lens adapted for directing side-scattered and/or forward-scattered radiation into at the further detector.

11. The particle sensor according to claim 5, comprising four thin lenses in a 2×2 matrix configuration between the region of interest and four detectors in a 2×2 matrix configuration.

12. The particle sensor according to claim 5, further comprising a radiation source for sending, into the radiation carrier, radiation within the range of wavelength of visible light, the substrate comprising a glass layer.

13. A sensing system comprising a plurality of particle sensors according to claim 5, a plurality of radiation carriers being provided along the at least one delivery means, wherein the at least one delivery means is at least one microfluidic channel for providing particles to a plurality of regions of interest.

14. The sensing system of claim 13, wherein the at least one delivery means comprises a plurality of channels.

15. The sensing system according to claim 13, wherein an excitation grating is provided for directing at least an excitation radiation beam from at least one of the plurality of radiation carriers into a region of interest comprising the whole width of the channel.

16. The sensing system of claim 13, wherein the detection system comprises a plurality of detectors that are integrated in a single unit.

17. The optical excitation system according to claim 1, wherein the radiation carrier is selected from a wave guide, an optical fiber, or a multilayer structure comprising metal and SiN layers.

18. The optical excitation system according to claim 1, wherein the radiation carrier comprises an excitation grating.

19. The optical excitation system according to claim 1, wherein the substrate is transparent.

* * * * *